G. BOYD & L. BRIDGE.
HEATER.
No. 177,460.  Patented May 16, 1876.
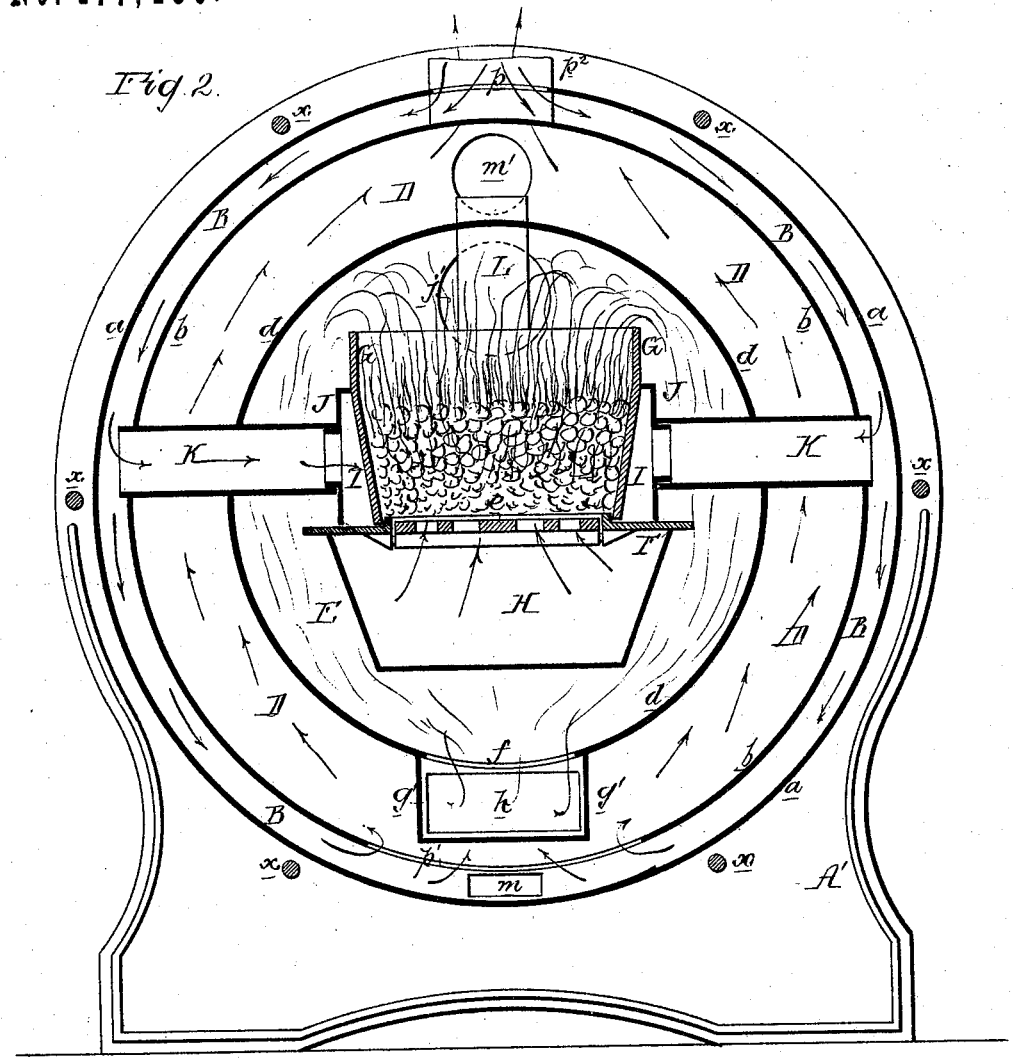
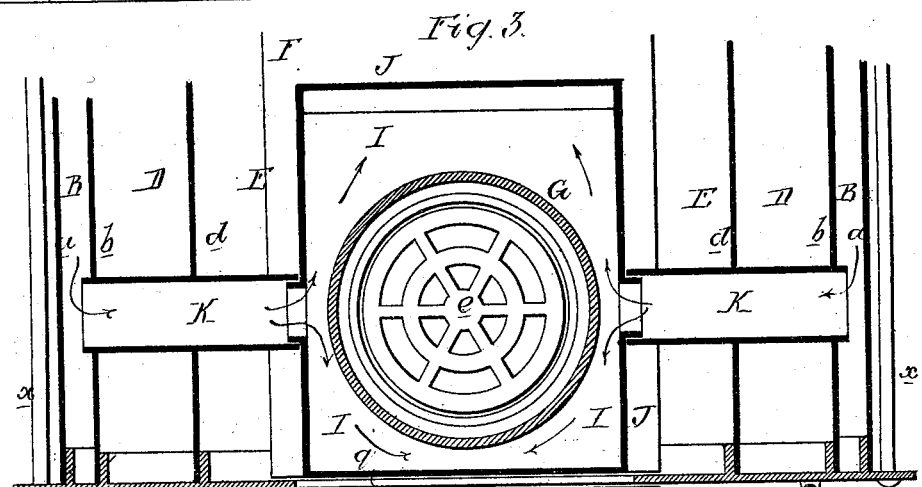

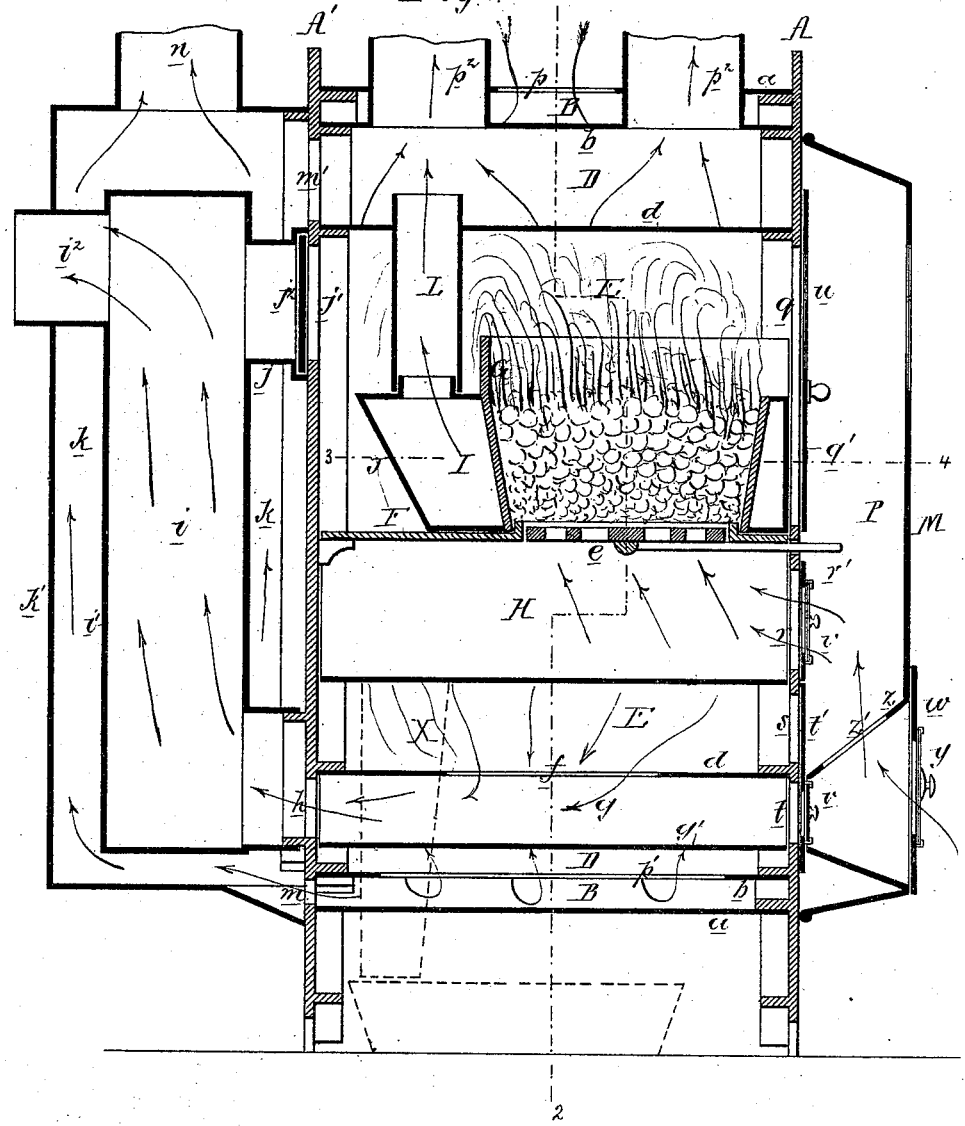

UNITED STATES PATENT OFFICE

GEORGE BOYD AND LEWIS BRIDGE, OF PHILADELPHIA, PENNSYLVANIA; SAID BRIDGE ASSIGNOR TO DAVID STUART AND RICHARD PETERSON, OF SAME PLACE.

IMPROVEMENT IN HEATERS.

Specification forming part of Letters Patent No. 177,460, dated May 16, 1876; application filed April 19, 1876.

*To all whom it may concern:*

Be it known that we, GEORGE BOYD and LEWIS BRIDGE, of Philadelphia, Pennsylvania, have invented certain Improvements in Heaters, of which the following is a specification.

The main object of our invention is to construct a simple and economical heater, in which the products of combustion are more thoroughly utilized for heating purposes than in ordinary heaters; further objects of the invention being to prevent the loss of heat by radiation, and to provide for the ready removal of the fire-pot for repairs, &c. These objects we attain in the manner which we will now proceed to describe, reference being had to the accompanying drawing, in which—

Figure 1, Sheet 1, is a longitudinal section of our improved heater; Fig. 2, Sheet 2, a transverse section on the line 1 2; and Fig. 3, Sheet 2, a sectional plan on the line 3 4, Fig. 1.

The main body of the heater, which we prefer to make of a cylindrical form, consists of a series of concentric casings, $a$, $b$, and $d$, of different diameters, confined between a front plate, A, and rear plate A', which are secured together by bolts $x$, as shown in Figs. 2 and 3. Between the casings $a$ and $b$ intervenes an annular cold-air chamber, B; and between the casings $b$ and $d$ is formed an annular hot-air chamber, D, the cylindrical space inclosed by the casing $d$ being the combustion-chamber E, within which is arranged a horizontal plate, F, supported at the ends upon suitable brackets, and carrying the fire-pot G and ash-pit H. The lower edge of the fire-pot is adapted to a flange surrounding an opening in the plate F, and to this opening is fitted a grate, $e$, of any suitable construction. Beneath the combustion-chamber, and communicating with the same through an opening, $f$, in the casing $d$, is a flue, $g$, contained within a casing, $g'$, and communicating, through an opening, $h$, in the rear plate A', with the lower portion of an exit-flue, $i$, in a casing, $i^1$, and communicating at the upper end, through a pipe, $i^2$, with the chimney. The flue $i$ also communicates at the upper end with the combustion-chamber through a connecting-pipe, $j$, and an opening, $j^1$, in the rear plate A', a damper, $j^2$, however, serving to cut off the communication when desired. The casing $i^1$, inclosing the flue $i$, is arranged within a chamber, $k$, contained within a casing, $k'$, secured to a flange on the rear side of the plate A', and this chamber communicates at the bottom with the cold-air chamber B of the heater through an opening, $m$, and, at the top, with the hot-air chamber D through an opening, $m'$.

The chamber $k$ may, instead of, or in addition to, communicating with the hot-air chamber B, be provided at the top with an exit-pipe, $n$, leading to upper rooms.

The cold-air chamber B communicates with the atmosphere through an opening, $p$, in the top of the casing $a$, and with the hot-air chamber D through an opening, $p^1$, at the bottom of the casing $b$, and the hot-air chamber is provided at the top with two exit-pipes, $p^2$ $p^2$, communicating with the rooms to be heated. Surrounding the fire-pot G is a chamber, I, inclosed by a casing, J, and this chamber communicates, through transverse pipes K K, with the cold-air chamber B of the heater, and, through a vertical pipe, L, with the hot-air chamber D. In the front plate A of the heater are four openings, $q$, $r$, $s$, and $t$, the opening $q$ communicating with the upper portion of the combustion-chamber adjacent to the fire-pot, the opening $r$ communicating with the ash-pit, the opening $s$ with the lower portion of the combustion-chamber, and the opening $t$ with the flue $g$. To the openings $q$ and $r$ are adapted hinged doors $q'$ and $r'$, and to the openings $s$ and $t$ is adapted a door, $t'$, the door $q'$ having a mica-covered opening, $u$, and the doors $r'$ and $t'$ openings provided with dampers $v$. The greater portion of the front of the heater is inclosed by a casing, M, within which is a chamber, P, and which is hinged at one side to the front plate A. Near the bottom of this casing is an opening, to which is adapted a door, $w$, provided with a damper, $y$, and a conical casing, $z$, in which is formed an opening, $z'$, extends from the edges of this opening to the edges of the damper $v$ of the door $t'$.

Air to support combustion enters through the opening in the door $w$, and passes through the opening $z'$ in the casing $z$ into the chamber P, in which it becomes slightly heated, and then, the damper $v$ of the door $r'$ being open, passes through the opening $r$ into the ash-pit, and thence up through the bed of fuel on the grate $e$.

The products of combustion pass up over the edges of the fire-pot, and down along the sides of the same, entirely filling the chamber E, and imparting a high degree of heat to the casing $d$ before passing into the flue $g$ and exit-flue $i$, the casings of which also become highly heated. Cold air enters the annular chamber B through the opening $p$ at the top, and, passing down through the same, enters the chamber D at the bottom through the opening $p^1$, and, after being brought into intimate contact with the highly-heated casings of the flue F and chamber E, escapes through the pipes $p^2$.

The casing $b$ of the hot-air chamber D imparts a heat to the air in the chamber B before it enters the hot-air chamber D, and hence this air does not chill the highly-heated surfaces with which it comes in contact. Air from the chamber B also passes through the pipes K into the chamber I, surrounding the fire-pot, and as the walls of the latter are intensely heated this air soon becomes hot, and, ascending through the pipe L, mingles with the air in the chamber D. A supply of cold air also enters at the bottom of the chamber $k$ at the rear of the heater, and, ascending through the same in contact with the casing $i^1$ of the exit-flue, becomes heated, and passes either through the opening $m'$ into the hot-air chamber D or through the pipe $n$.

On starting the fire the damper $j^2$ should be opened, and the products of combustion permitted to pass directly to the chimney; but when the fire has been fully kindled the damper must be closed, and the products of combustion compelled to pass through the chamber E, flue $g$, and exit flue $i$, as above described.

When it is desired to check the draft of the heater the damper $v$ of the door $t'$ should be opened, and cold air allowed to pass through the flue $g$, and into the flue $t$. This manipulation of the damper can be readily effected by opening the door $w$ of the casing M without disturbing the latter.

In some cases a chute, X, may be combined with the ash-pit H, as shown by dotted lines in Fig. 1, this chute communicating below with a suitable receptacle for the ashes.

It will be seen that the main feature of our invention consists in suspending the fire-pot within the combustion-chamber, so that the entire casing of the latter is made available as a heating-surface, and by arranging the heating-chamber so as to encircle the combustion-chamber, the good effect of this arrangement being still further increased by surrounding the heating-chamber with a cold-air chamber, which prevents loss of heat by radiation.

It will be observed, on reference to Figs. 1 and 3, that the opening $q$ in the front plate A of the heater is somewhat wider and higher than the fire-pot G and its encircling casing J, so that in case repairs become necessary the said fire-pot and casing can, after detaching the pipes K and L, be removed and replaced through the opening $q$ without disturbing other parts of the heater.

In some cases water instead of air may be caused to pass through the chamber I, surrounding the fire-pot, suitable induction and eduction pipes passing entirely through the casing of the heater, taking the place of the pipes K and L.

Owing to the use of the casing M, inclosing the front of the heater, the loss of heat by radiation is prevented, and a chamber, P, is formed for heating the air before it passes into the ash-pit, thereby causing the more perfect combustion of the fuel in the fire-pot.

We claim as our invention—

1. The combination, in a heater, of a combustion-chamber with a fire-pot and ash-pit suspended within the said chamber, and surrounded by the casing $d$ of the same, all substantially as set forth.

2. The combination, in a heater, of the combustion-chamber E and the suspended fire-pot with the hot-air chamber D, surrounding the said combustion-chamber, as set forth.

3. The combination, in a heater, of the annular hot-air chamber D, the combustion-chamber, and the surrounding annular cold-air chamber B, as set forth.

4. The combination of the front plate A of the heater with the casing M, as set forth.

5. The combination of the flue $g$, the door $t'$, and its damper $v$ with the casing M and its door $w$, as set forth.

6. The combination of the combustion-chamber E and exit-flue $i$ with the flue $g$.

In testimony whereof we have signed our names to this specification in the presence of two subscribing witnesses.

GEORGE BOYD.
LEWIS BRIDGE.

Witnesses:
HARRY HOWSON, Jr.,
HARRY SMITH.